United States Patent [19]

Ou-Yang

[11] 4,327,147

[45] Apr. 27, 1982

[54] SHEAR-ACTIVATED INNERSEAL

[75] Inventor: David T. Ou-Yang, Cottage Grove, Wash.

[73] Assignee: Minnesota Mining and Manufacturing Company, Saint Paul, Minn.

[21] Appl. No.: 266,140

[22] Filed: May 22, 1981

[51] Int. Cl.$^3$ .................... B32B 5/16; B32B 7/02; B32B 27/18
[52] U.S. Cl. .................... 156/69; 428/319.9; 428/317.3; 428/355; 156/262; 156/73.5; 156/212; 156/292; 156/309.6; 156/334
[58] Field of Search ............ 428/310, 311, 315, 355; 156/262

[56] References Cited

U.S. PATENT DOCUMENTS

| | | | |
|---|---|---|---|
| 3,265,765 | 8/1966 | Holden et al. | 525/271 |
| 3,787,531 | 1/1974 | Dahlquist et al. | 428/355 |
| 3,995,087 | 11/1976 | Desanzo | 428/310 |
| 4,039,705 | 8/1977 | Douek et al. | 428/40 |
| 4,061,820 | 12/1977 | Magid et al. | 428/310 |
| 4,086,388 | 4/1978 | Brown | 428/355 |
| 4,287,013 | 9/1981 | Ronning | 428/355 |

OTHER PUBLICATIONS

Cap-Seal ® Closure Liners, 3M Company, Publication FP-C-ADSAM, (68.05)11, 1980.
Protect Product Purity, 3M Company, Publication FP-SG1B7, (67.2)JR, 1979.

*Primary Examiner*—William J. Van Balen
*Attorney, Agent, or Firm*—Cruzan Alexander; Donald M. Sell; James V. Lilly

[57] ABSTRACT

The present invention discloses a sheet material useful as an innerseal that comprises a dimensionally stable substrate having at least 0.001 g/cm$^2$ of a tack-free, shear-activated adhesive on one surface. The composition includes from 1 to 15 parts by weight of a block copolymer, from 1 to 25 parts by weight of a tackifier, and from 60 to 100 parts by weight of either a microcrystalline wax or an amorphous polyolefin. A mixture of the two can be used.

The sheet material is shear-activated and does not adhere or block to itself or other surfaces until a shear force is applied to it. Additionally, it does not require special heating equipment in order to adhere it to surfaces. In a preferred aspect of the invention the innerseal leaves a residue on the lip around a container opening thereby providing a visible indication of removal.

24 Claims, No Drawings

SHEAR-ACTIVATED INNERSEAL

FIELD OF THE INVENTION

The present invention relates to materials useful as closure liners, that is innerseals. More particularly, it relates to non-tacky, shear-activated innerseals which, in the preferred embodiment, visibly signal that there has been tampering with the innerseal.

BACKGROUND ART

Innerseals are widely used throughout the packaging industry to cover the opening of a container and to provide a seal between the container and the cap. Generally, two types of innerseals are used. The first merely consists of a dimensionally stable substrate which may be placed over the opening of the container. It is held in place only by the compressive forces between the container and the cap. As this type of innerseal is not adhered to the container, it neither protects against leaks and spills nor signals that there has been tampering with the innerseal once the cap is removed.

The second general type of innerseal utilizes an adhesive composition on one surface of a dimensionally stable substrate. The adhesive compositions employed most commonly are either pressure-sensitive compositions or heat-activated compositions. While both of these compositions have been used to adhere innerseals to container openings, they both suffer from certain disadvantages.

Innerseals that employ pressure-sensitive adhesive layers commonly require the use of release liners to prevent the innerseal from adhering to itself prior to application to a container. This, in turn, makes handling and applying such innerseals more cumbersome and less efficient as the liner must be removed and discarded before the innerseal can be used. Additionally, the liner creates waste which must be handled and discarded.

Innerseals that employ heat-activated adhesive layers require the use of special application equipment, thereby adding to the expense of the packaging operation and increasing the opportunity for equipment malfunction. Furthermore, one of the more commonly used heat-activating techniques utilizes high frequency induction sealing. This technique requires the presence of a metal foil layer in the innerseal and, consequently, is useful for only certain types of innerseals.

Innerseal materials that can be adhered to a container by the application of shear forces have also been used. It is believed that these materials utilize a coating of an ethylene-vinyl acetate based composition to adhere the innerseal to the container. These materials are not, however, totally satisfactory as they exhibit poor resistance to high humidity and temperature (e.g., 70% relative humidity at 70° C.). Thus, lose adhesion to the container when subjected to these same conditions. Additionally, these materials discolor when contacted by a Saran-coated cap.

The present invention, however, overcomes these disadvantages of both the pressure-sensitive and the heat-activated adhesives. It does this by utilizing a coating of a shear-activated adhesive composition on a dimensionally stable substrate. The adhesive composition is also tack-free, that is it does not measurably adhere or block to itself when placed in contact with itself. Furthermore, it is not pressure-sensitive as it will not adhere to a surface by the brief application of a perpendicular force. Consequently, release liners need not be employed with the innerseal of the invention. Still further, it is not heat activated. Thus, no special heating equipment is necessary to apply an innerseal of the invention.

Even though the innerseal of the invention is shear-activated, it surprisingly adheres firmly to a container and provides a seal against leaks and spills therefrom even after the cap has been removed. Additionally, the innerseal of the invention neither discolors noticeably nor loses a substantial degree of adhesion to the container when subjected to conditions of high temperature and humidity. Moreover, it is readily removable from the container. The preferred innerseals of the invention provide a visible indication that they have been removed even though they are readily removable. The innerseal of the invention may be applied to containers made from a variety of materials including glass, polyethylene, polypropylene, polyvinyl chloride, polyester, polystyrene, and nitrile rubber modified acrylonitrile methacrylate copolymer.

DISCLOSURE OF THE INVENTION

In accordance with the present invention there is provided a sheet material useful as a shear-activated innerseal, said sheet material comprising a dimensionally stable substrate having at least about 0.001 (preferably between about 0.001 and 0.006) g/cm$^2$ of a torque-activated, tack-free adhesive composition on at least one major surface, said adhesive composition comprising (i) from about 1 to 15 (preferably from about 3 to 15) parts by weight of a block copolymer having the general formula A-B-A wherein A represents a terminal, glassy, resinous polymer block having a glass transition temperature above about 20° C. and an average molecular weight between about 2,000 and 100,000, and B represents a central, elastomeric polymer block having a glass transition temperature below about 20° C. and an average molecular weight between about 10,000 and 200,000;

(ii) from about 1 to 25 (preferably from about 5 to 25) parts by weight of an organic tackifier; and (iii) from about 60 to 100 (preferably from about 70 to 90) parts by weight of a hydrocarbon material selected from the group consisting of solid, microcrystalline wax, and amorphous polyolefin.

DETAILED DESCRIPTION

The innerseal of the invention may be provided in any desired form. Thus, it may be provided in individually designed shapes to cover a particular container opening or it may be provided in bulk either in the form of large sheets or rolls from which a desired shape and size may be subsequently removed.

The substrate utilized in the innerseal is dimensionally stable, that is, it neither loses its shape nor undergoes changes in dimension under normal use, handling, or storage conditions. The substrate may be compressible or essentially non-compressible and may be rigid or flexible. Additionally, it may have either a single or multiple ply construction. The plies may be of the same or different materials and may have any thickness desired. Typically, the innerseal is from about 0.02 to 0.5 cm thick. If a tamper indicating innerseal is desired, the substrate has an exfoliation strength of less than about 0.17 kg/cm width (0.93 lb/in width) and preferably in the range of 0.02 to 0.06 kg/cm width (0.13 to 0.4 lb/in width). If, on the other hand, a non-tamper indicating innerseal is desired, the backing has an exfoliation strength of more than 0.17 kg/cm width.

A wide variety of organic and inorganic materials may be used as the substrate including metal foils such as aluminum or copper foils, cellulosic materials such as paper, pulpboard, glassine and the like, and foamed and non-foamed polymeric films such as polyester, polyvinyl, polyolefin films (e.g., polyethylene and polypropylene), polystyrene, and the like. As noted, the substrate may include several plies. Thus, for example, it may include one or more layers of paper or pulpboard adhered to one or more layers of a metal foil or polymeric film.

The adhesive composition employed on the innerseal utilizes a block copolymer having the general formula A-B-A, an organic tackifier for the block copolymer, and a hydrocarbon material. The adhesive composition is shear-activated, that is it does not adhere to a surface until it has been sheared by, for example, a downward force applied with a twisting action. Once this force or torque is applied to the adhesive composition, the innerseal adheres firmly to the container. In the preferred aspect of the invention, the bond between the adhesive and the surface it contacts is of sufficient strength that when the innerseal is removed from the surface at least some of the adhesive remains adhered to the surface. The exact mechanism by which the adhesive remains adhered to the surface may be caused by delamination of the substrate from the adhesive; internal splitting of the adhesive; or internal splitting of the substrate, each occurring at least where the adhesive contacts the lip of the container. In any event, the residue of the surface indicates that there has been tampering with the innerseal.

The amount of adhesive employed is at least 0.001 g/cm$^2$, and preferably is from 0.001 to 0.006 g/cm$^2$. More than 0.006 g/cm$^2$ may be employed if desired although there is generally no advantage obtained in terms of improved adhesion by so doing.

The block copolymers utilized in the adhesive composition are preferably those wherein the B or elastomeric block is a conjugated diene prepared from a material such as isoprene, butadiene, copolymers of ethylene or styrene and butadiene as well as their homologues such as polymers of ethylene and butylene, and the like. Preferably the elastomeric blocks comprise at least about 70% by weight of the block copolymer.

The remaining or A blocks of the block copolymer are glassy and are preferably prepared from monovinyl aromatic hydrocarbons, particularly those of the benzene series such as styrene. The A blocks preferably comprise at most 30% by weight of the block copolymer.

Examples of commercially available block copolymers useful in the invention include the Kraton ® series of materials available from the Shell Chemical Company and including Kraton ® 1101 (a styrene-butadiene-styrene block copolymer containing about 30% by weight styrene), Kraton ® 1102 (a styrene-butadiene-styrene block copolymer containing about 28% by weight styrene); Kraton ® 1107 (a styrene-isoprene-styrene block copolymer containing about 14% by weight styrene), and Kraton ® G 1652 (a styrene-ethylene/butylene-styrene block copolymer containing about S29% by weight styrene). Materials of this type are described more fully in U.S. Pat. No. 3,265,765 incorporated herein by reference.

The tackifier utilized in the adhesive is compatible with the elastomeric or B blocks of the block copolymer and is preferably also compatible with the resinous or A blocks of the copolymer. The tackifier is considered compatible with the particular block if a thin film cast from a solution of the tackifier and the material of the block (i.e., polyisoprene, polybutadiene, polystyrene, etc.) is clear. The level of tackifier and material of the block employed in this test is chosen so as to correspond to the level present when the tackifier is combined with the block copolymer.

The amount of tackifier employed in the adhesive may vary from about 1 to 25 (preferably 5 to 25) parts by weight. However, it is most preferred that the weight ratio of the tackifier to the block copolymer be maintained at about 1.7:1 no matter what the level of block copolymer utilized.

Tackifiers useful in the adhesive composition may be selected from a variety of materials including aliphatic and aromatic hydrocarbon resins, hydrocarbon monomers, rosins, and modified resins. Examples of these materials include, for example, rosin, hydrogenated rosin, rosin+polyterpene resins, glycerol esters of hydrogenated rosin, coumarone-indene resins, hydrogenated rosin glycerol esters of polymerized rosin, maleic anhydride-modified rosin, rosin derivatives of partial esters of styrene-maleic acid copolymers, low molecular weight polystyrene and homologues thereof, copolymers of styrene and terpene resins, and phenol-aldehyde resins. Other classes of tackifiers are also useful as will be clear from this disclosure and they are intended to be included in the scope hereof.

Examples of commercially available tackifiers include those available from Hercules, Incorporated as "Piccopale" 85, "Piccotac" B-BHT, "Picco" 6070, Piccomer "100, Piccovar" AP60, "Piccoumeronl" 60, "Piccolastic" A-75, "Piccotex" 120, "Piccolyte" A-135, "Piccoflyn" A-100, "Krystalex" 3085, "Foral" 85, and "Staybelite". Examples of other tackifiers include "Arkon" M-902 from Arakawa Chemicals, "Escorez" 1310 available from Exxon Chemicals, "Wingtac" 95 available from Goodyear Chemicals, and "Zonarez" 7100 and "Zonatac" 105 both available from Arizona chemicals.

The hydrocarbon material useful in the adhesive is solid and is substantially less adhesive than the block copolymer and is compatible with at least the elastomeric or B blocks thereof and is selected from microcrystalline wax and amorphous polypropylene. Microcrystalline waxes are referred to as such because their relatively small crystals give an amorphous appearance to the waxes in the solid state. While microcrystalline waxes vary considerably in composition, they generally comprise straight and/or branched chain hydrocarbons such as olefins, particularly ethylene, and cyclic hydrocarbons such as naphthenic hydrocarbons. Their molecular weights typically range from about 400 to 1000 and their melting points typically vary from about 60° C. to 90° C. as measured according to ASTM D-127.

Examples of microcrystalline waxes useful in the present invention include Victory ® of wax and Be Square ® 175 wax available from the Bareco Division of Petrolite Corporation. These waxes respectively melt at about 79° C. and 83° C. and contain only about 20 to 40% n-paraffinic hydrocarbons. Other useful microcrystalline waxes include the Multiwax ® series of waxes available from the Sonneborn Division of Witco Chemical. These waxes include Multiwax ® 180-M (melting point of about 82°–88° C.), Multiwax ® ML-445 (melting point of about 77°–82° C.), and Multiwax ® W-445 (melting point of about 77°–82° C.). Blends of the individual components of the microcrystalline wax may also be utilized.

Amorphous polyolefins useful in the invention soften over a rather wide range of temperatures, e.g., from about 20° to 160° C. Their number average molecular weights likewise may vary over a wide range, e.g., 2000 to 4000. Representative examples of useful polyolefins include "A-Fax" 800, an amorphous polypropylene having a softening point of about 20° C. and a number average molecular weight of about 2000, and "A-Fax" 940, an amorphous polypropylene having a softening point of about 155° C. and a number average molecular weight of about 4000. Other useful amorphous polypropylenes are "A-Fax" 500 and 600. These materials soften at about 50° C. and 120° C. respectively. The "A-Fax" materials are available from Hercules, Incorporated.

The microcrystalline wax and amorphous olefin may be utilized either separately or in combination. In the event that they are used separately, that is only a wax or only an olefin is employed, it is preferred that the hydrocarbon material comprise a mixture of either a higher melting wax (i.e., melting point above about 80° C.) or a higher softening amorphous olefin (i.e., softening point above about 100° C.) and either a low melting wax (i.e., melting point below about 80° C.) or a lower softening amorphous olefin (i.e., softening point below about 100° C.). The weight ratio of the higher melting or softening component to the lower melting or softening component is preferably in the range of 1:0.75 to 1:2.5. If, on the other hand, a mixture of a wax and olefin is utilized, the weight ratio of the higher melting or softening component to the lower melting or softening component is preferably in the range of 1:0.75 to 1:4.

A variety of other ingredients may be incorporated into the adhesive composition provided that neither they nor the amount added change the tack-free, shear-activated nature of the adhesive. Such ingredients include fillers, antioxidants, ultraviolet light stabilizers, colorants, adhesion modifiers, and the like.

The adhesive utilized in the present invention may be readily prepared. For example, the block copolymer, tackifier, and hydrocarbon material may be mixed with a suitable solvent (e.g., heptane) at a slightly elevated temperature (e.g., 65° C.) until all of the ingredients have dissolved or are suitably dispersed. Other ingredients such as fillers, antioxidants, ultraviolet light stabilizers, colorants, adhesion modifiers and the like may also be added with the block copolymer, tackifier, and microcrystalline wax.

The adhesive may also be prepared by so called hot-melt techniques wherein the ingredients are heated and mixed together until a homogenous molten mass is obtained. The mass may then be applied directly to the substrate or cooled until solid and stored for subsequent application to the substrate.

A variety of techniques may be utilized to apply the adhesive to the substrate. For example, adhesives prepared by solution techniques may be applied to the substrate at an elevated temperature (e.g., 65° C.) by, for example, roll coating, Meyer bar coating, or rotogravure coating techniques. After application of the adhesive, the solvent may be removed by heating the substrate at a temperature and for a time sufficient to remove the solvent but insufficient to degrade either the adhesive or the substrate. A step-wise drying process wherein the coated substrate is heated at about 45° C. for about thirty minutes and then heated at about 95° C. for about thirty minutes is preferred. Higher temperatures may be employed if desired.

Adhesives prepared by hot-melt techniques may be applied to the substrate by, for example, rotogravure techniques. Preferably, a tri-helical rotogravure roll is utilized. Temperatures of about 100° to 160° C. are adequate coating temperatures. The coated substrate is then cooled to permit the adhesive to solidify.

The resultant sheet material may then be cut to any desired shape and applied to a container. Techniques for application to a container are known and will not be described in detail here. Briefly, they involve placing a section of the sheet material either in a cap to be applied to the container or over the opening of the container so that the adhesive coating is disposed to contact the lip of the container opening. Preferably the section of innerseal applied is slightly larger in size (e.g., diameter) than the sum of the size of the container opening plus the lip surrounding it. The cap is then placed over the opening and tightened to the container. While the present invention may be used with equal effectiveness on threaded and non-threaded (e.g., snap fit) closures, it must be remembered that it is necessary to apply a twisting or torque force to the innerseal in order to activate the adhesive.

The amount of torque that must be applied to the innerseal in order to adhere it to the container is somewhat dependent upon the size of the opening to be covered. The following table lists several opening sizes, in terms of the diameter of the caps used to cover the openings, and the representative torque forces which gave excellent adherence to the innerseal to a glass bottle.

| Cap Diameter (mm) | Torque (m-kg) |
|---|---|
| 15 | 0.06 (5 in-lbs) |
| 20 | 0.11 (10 in-lbs) |
| 28 | 0.20 (18 in-lbs) |
| 38 | 0.28 (25 in-lbs) |
| 43 | 0.31 (27 in-lbs) |
| 48 | 0.34 (30 in-lbs) |
| 53 | 0.39 (34 in-lbs) |
| 63 | 0.45 (40 in-lbs) |
| 70 | 0.51 (45 in-lbs) |

However, significantly lower torque forces are generally all that is required to provide satisfactory adherence to the innerseal to the container. For example, a torque force of as low as 0.08 m-kg (7 in-lbs) satisfactorily adheres the innerseal to a glass bottle that utilizes a 28 mm diameter cap. By way of contrast, the brief application of pressures as high as about 14 kg/cm$^2$ (200 lb/in$^2$) perpendicularly with no twisting motion to the innerseal did not adhere it to the lip of a bottle.

The present invention is further described by the following examples wherein all amounts are parts by weight unless otherwise specified.

EXAMPLE 1

A hot melt, shear-activated adhesive was prepared from the following ingredients:

|  | Parts |
| --- | --- |
| Kraton ® G-1652 | 4.3 |
| Zonarez 7100 | 4.3 |
| Piccotac B-BHT | 2.9 |
| Ethanox 330 (antioxidant) | 0.5 |
| Victory Wax | 26.0 |
| Be Square 175 Wax | 60.2 |
| Vistanex LM-MS (a viscosity average molecular weight 8700 to 10,000 polyisobutylene adhesion modifier, from Exxon Chemical Company) | 1.9 |

The adhesive composition was applied to a substrate by means of a 30 Q trihelical rotogravure roll at about 120° C. at a coating speed of about 21 m/min (70 ft/min) and subsequently allowed to cool to room temperature to provide a coating in the range of 0.0041 g/cm² to 0.0045 g/cm² on the substrate.

The substrate comprised a foamed polystyrene film from Valcour Imprinted Papers, Incorporated. The substrate had a thickness of from about 0.02 to 0.1 cm thick.

The resulting sheet material was tack-free. About 0.22 m-kg (20 in-lbs) torque was used to adhere the innerseal to a glass bottle having a 38 cm diameter cap. After being removed from the bottle, some of the adhesive and substrate remained on the lip of the bottle. Thus, the innerseal was useful as a tamper indicating innerseal. It was also useful as a tamper indicating innerseal on plastic bottles.

EXAMPLE 2

A shear-activated adhesive composition was prepared from the following ingredients:

|  | Parts |
| --- | --- |
| Kraton ® 1107 | 3.2 |
| Kraton ® G-1652 | 2.2 |
| Zonarex 7100 | 8.6 |
| Piccotac B-BHT | 5.7 |
| Ethanox 330 | 0.5 |
| Victory Wax | 42.2 |
| Vistanex LM-MS | 5.2 |
| Heptane | 31.9 |

The adhesive composition was applied to a foamed polystyrene film substrate from Valcour Imprinted Papers, Incorporated (0.02 to 0.1 cm thick) by rotogravure coating and dried at 45° C. to provide a dried, tack-free coating weight of about 0.002 g/cm².

The resulting sheet material was tack-free. About 0.22 m-kg (20 in-lbs) torque was used to adhere the innerseal to a glass bottle having a 38 cm diameter cap. After being removed from the bottle, some of the adhesive and substrate remained on the lip of the bottle. Thus, the innerseal was useful as a tamper indicating innerseal. It was also useful as a tamper indicating innerseal on plastic bottles.

EXAMPLE 3

A hot melt, shear-activated innerseal was prepared according to the procedures described in Example 1. The substrate comprised a foamed polystyrene film available from Valcour Imprinted Papers, Incorporated. The adhesive composition comprised:

|  | Parts |
| --- | --- |
| Kraton ® G-1652 | 13 |
| Zonatac 105 | 10.9 |
| Piccotac B-BHT | 10.9 |
| Multiwax W-835 | 39.1 |
| Be Square 175 | 26 |
| Ethanox 330 | 0.5 |

The resulting sheet material was tack-free. About 0.22 m-kg (20 in-lbs) was used to adhere the innerseal to a glass bottle having a 38 cm diameter cap. After being removed from the bottle, some of the adhesive and substrate remained adhered to the bottle. Thus, the innerseal was useful as a tamper indicating innerseal. It was useful as a tamper indicating innerseal on plastic bottles.

I claim:

1. A sheet material useful as a shear-activated innerseal, said sheet material comprising a dimensionally stable substrate having at least about 0.001 g/cm² of a shear-activated, tack-free adhesive composition on at least one major surface, said adhesive composition comprising
   (i) from about 1 to 15 parts by weight of a block copolymer having the general formula A-B-A wherein A represents a terminal glassy resinous polymer block having a glass transition temperature above about 20° C. and an average molecular weight between about 2,000 and 100,000, and B represents a central elastomeric polymer block having a glass transition temperature below about 20° C. and an average molecular weight between about 10,000 and 200,000;
   (ii) from about 1 to 25 parts by weight of an organic tackifier; and
   (iii) from about 60 to 100 parts by weight of a hydrocarbon material selected from the group consisting of solid microcrystalline wax and amorphous polyolefins and combinations thereof.

2. A sheet material according to claim 1 having from about 0.001 to 0.006 g/cm² of said adhesive composition on said major surface of said substrate.

3. A sheet material according to claim 1 wherein said coating comprises from about 3 to 15 parts by weight of said block copolymer, from about 5 to 25 parts by weight of said tackifier, and from 70 to 90 parts by weight of said hydrocarbon material.

4. A sheet material according to claim 1 wherein the weight ratio of said tackifier to said block copolymer is about 1.7:1.

5. A sheet material according to claim 1 wherein said substrate is flexible.

6. A sheet material according to claim 5 wherein said substrate comprises a foamed film.

7. A sheet material according to claim 6 wherein said foamed film contains a plurality of substantially uniform cells.

8. A sheet material according to claim 7 wherein said foamed film is selected from the group consisting of foamed polystyrene, foamed polyethylene, foamed polypropylene, and foamed ethylene-vinyl acetate copolymer.

9. A sheet material according to claim 1 wherein said A blocks are prepared from monovinyl aromatic hydrocarbons and said B blocks are prepared from a conjugated diene and homologues thereof.

10. A sheet material according to claim 9 wherein said monovinyl aromatic hydrocarbon is styrene and said conjugated diene is selected from the group consisting of isoprene, butadiene, and ethylene-butylene polymers.

11. A sheet material according to claim 1 wherein said tackifier is selected from the group consisting of linear and aromatic hydrocarbon resins, hydrocarbon monomers, rosins, modified rosins.

12. A sheet material according to claim 1 wherein said tackifier is selected from the group consisting of rosin, dehydrogenated rosin, rosin+polyterpene resins, glycerol esters of hydrogenated rosin, coumarone-indene resins, hydrogenated rosin glyceral esters of polymerized rosin, maleic anhydride-modified rosin and rosin derivative partial esters of styrene-maleic acid polymers, low molecular weight polystyrene and homologues thereof, copolymers of styrene and terpene resins, and phenolaldehyde resins.

13. A sheet material according to claim 1 wherein said hydrocarbon material comprises solid microcrystalline wax.

14. A sheet material according to claim 13 wherein said microcrystalline wax comprises a mixture of at least two of said waxes, the first having a melting point in the range of 60° to 80° C. and the second having a melting point in the range of 80° to 90° C.

15. A sheet material according to claim 14 wherein the weight ratio of said second wax to said first wax is in the range of 1:0.75 to 1:2.5.

16. A sheet material according to claim 1 wherein said hydrocarbon material comprises a blend of said solid microcrystalline wax and said amorphous polyolefin.

17. A sheet material according to claim 16 wherein the weight ratio of said amorphous polyolefin to said microcrystalline wax is in the range of 1:0.75 to 1:4.

18. A sheet material according to claim 17 wherein said amorphous polyolefin comprises amorphous polypropylene.

19. A sheet material according to claim 18 wherein said microcrystalline wax has a melting point in the range of 80° to 90° C. and said amorphous polypropylene has a melting point in the range of about 20° to 155° C.

20. A sheet material useful as a tamper indicating, torque-activated innerseal, said sheet material comprising a layer of foamed film having an exfoliation strength of less than about 0.17 kg/cm width and bearing, on at least one of its major surfaces at least about 0.001 gm/cm$^2$ of a torque-activated, tack free adhesive composition comprising
(i) from about 4 to 10 parts by weight of a block copolymer having the general formula A-B-A wherein A represents a block prepared from a monovinyl aromatic hydrocarbon having a glass transition temperature above about 20° C. and an average molecular weight between about 2,000 and 100,000, and B represents a block prepared from a conjugated diene and homologues thereof having a glass transition temperature below about 20° C. and an average molecular weight between about 10,000 and 200,000;
(ii) from about 5–20 parts by weight of an organic tackifier; and
(iii) from about 70 to 90 parts by weight of a hydrocarbon material selected from the group consisting of microcrystalline wax, amorphous polyolefin, and mixtures thereof, wherein after said sheet material has been placed over the lip around the opening of said container with said torque-activated adhesive contacting said lip, and wherein after sufficient torque has been applied to said sheet material to shear said adhesive contacting said lip and cause said sheet material to adhere to said lip, said adhesive adheres to said lip more strongly than said adhesive adheres to said foamed film so that when said sheet material is removed from said opening, at least a portion of said adhesive remains adhered to said lip and provides a visual indication that said sheet material has been removed.

21. A sheet material according to claim 20 wherein said adhesive splits internally at least where said adhesive contacts said lip when said sheet material is removed from said opening.

22. A sheet material according to claim 20 wherein said substrate delaminates from said adhesive at least where said adhesive contacts said lip when said sheet material is removed from said opening.

23. A sheet material according to claim 20 wherein said substrate splits internally at least where said adhesive contacts said lip when said sheet material is removed from said opening.

24. A method for providing a tamper indicating seal on a bottle closure, said method comprising
constructing sheet material having a dimensionally stable substrate having at least about 0.001 g/cm$^2$ of a coating of a shear-activated, tack-free adhesive composition on one major surface thereof, wherein said adhesive composition comprises
(i) from about 4 to 10 parts by weight of a block copolymer having the general formula A-B-A wherein A represents a block prepared from a monovinyl aromatic hydrocarbon having a glass transition temperature above about 20° C. and an average molecular weight between about 2,000 and 100,000 and B represents a block prepared from a conjugated diene and homologoes thereof having a glass transition temperature below about 20° C. and an average molecular weight between about 10,000 and 200,000;
(ii) from about 5–20 parts by weight of an organic tackifier; and
(iii) from about 70 to 90 parts by weight of hydrocarbon material selected from the group consisting of microcrystalline wax, amorphous polyolefin, and mixtures thereof;
applying said sheet material to the lip surrounding said bottle closure so that said shear-activated adhesive composition contacts said lip;
applying sufficient force to said sheet material to shear said adhesive and cause said sheet material to adhere to said lip and provide a bond between said shear-activated adhesive and said lip that is stronger than the bond between said shear-activated adhesive and said substrate so that when said sheet material is removed from said lip at least a portion of said adhesive remains adhered to said lip and provides a visual indication that said sheet material has been removed.

* * * * *

UNITED STATES PATENT AND TRADEMARK OFFICE
CERTIFICATE OF CORRECTION

PATENT NO. : 4,327,147
DATED : April 27, 1982
INVENTOR(S) : David T. Ou-Yang

It is certified that error appears in the above—identified patent and that said Letters Patent is hereby corrected as shown below:

Col. 3, line 32, "of" should read --on--.

Col. 3, line 65, "S29%" should read --29%--.

Col. 9, line 14, "glyceral" should read --glycerol--.

Signed and Sealed this

Seventeenth Day of August 1982

[SEAL]

Attest:

GERALD J. MOSSINGHOFF

Attesting Officer   Commissioner of Patents and Trademarks